United States Patent Office 3,122,837
Patented Mar. 3, 1964

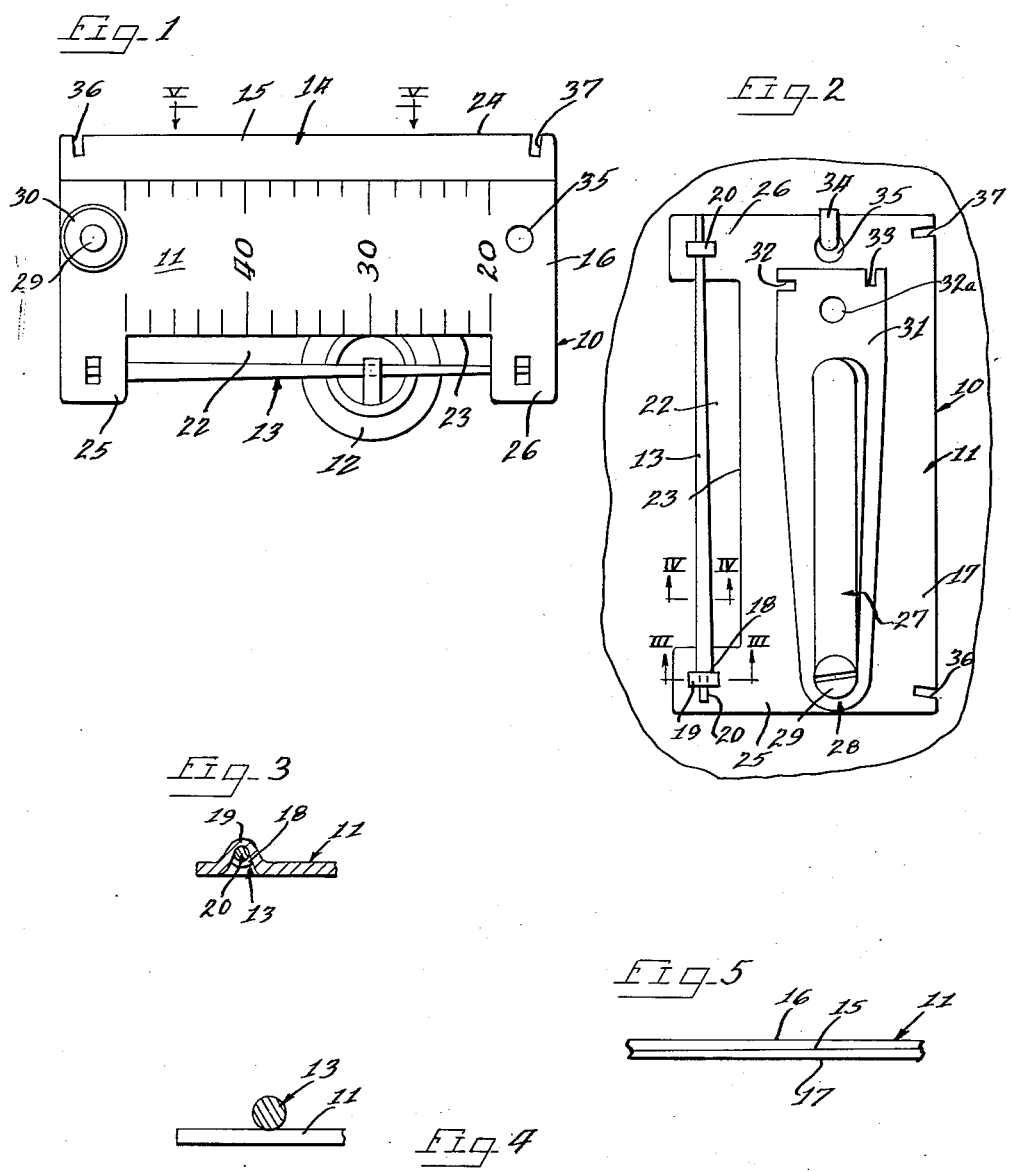

3,122,837
GAUGE
Theodore S. Wrona, 2140 N. Lamon, Chicago, Ill.
Filed Feb. 20, 1962, Ser. No. 174,612
5 Claims. (Cl. 33—168)

This invention relates to a gauge for measuring the distance between the points of a spark plug or the like, and more particularly to a device as described which is characterized by simplicity and accuracy in use.

Previous gauges of similar type of which I am aware, have either been cumbersome and required movable parts, or have been deficient in accuracy.

The present invention overcomes these problems by providing a tapered element fixedly connected with a plate having indicia thereon. By moving the points or electrodes of a spark plug along the tapered element until engaged thereby, the user can determine the width of the spark plug gap, simply by reading the indicia in register with the points. In a preferred form of the invention, the tapered element constitutes a pin having a circular cross section. This affords a highly accurate measuring means, since it hits the high points only of the spark plug electrodes. And inasmuch as the points occasionally are not parallel, or are slanted, the tapered pin gauge will serve to locate the high points.

In another form of the invention, which may be utilized in conjunction with the first form in a single instrument, or otherwise, the tapered element constitutes an integral portion of the plate which forms an inclined plane with respect to one surface of the plate, whereby a tapered gauge is afforded which may be grasped readily, as opposed to a single wedge or the like, and which may be read without difficulty since the indicia again are disposed to one side of the tapering element.

Further in accordance with the invention, feeler gauges are attached by suitable fastening means to the plate of the invention so that a wide range of application is afforded; and desirably, means are formed in the plate for suspending the gauge on a hook or the like.

Accordingly, it is an object of the present invention to provide a gauge for determining the gap of spark plug points, or any other such gap, which is characterized by extreme simplicity of construction, accuracy of measuring capability and ease of use.

Another object of the invention is to provide a device as described which, in an embodiment characterized by a tapered pin construction, serves to locate the high points of spark plug electrodes.

Another object of the invention is to provide a device as described which combines in one instrument a versatile gap measuring means and an assemblage of feeler gauges.

Other objects and advantages of the invention will become apparent as the description proceeds in accordance with the drawings, in which:

FIGURE 1 is a top plan view of a gauge according to the present invention in operative relation to a spark plug;

FIGURE 2 is a rear elevational view of a gauge according to the invention and support means therefor;

FIGURE 3 is a vertical sectional fragmentary view taken through the lines III—III of FIGURE 2;

FIGURE 4 is a vertical sectional view, somewhat enlarged, in fragmentary form, taken through the lines IV—IV of FIGURE 2; and FIGURE 5 is a fragmentary side elevational view taken along lines V—V of FIGURE 1.

Referring now to the drawings, a gauge 10 is shown according to the present invention which includes a plate 11 which may be of any readily machinable and light material such as aluminum, or of other suitable metal, plastic or rigid material. In order to afford a means of determining the width of the spark gap or distance between the points or electrodes on a spark plug 12, tapering gauge means are provided on the plate 11 which are generally indicated by reference numerals 13 and 14 respectively, and which represent alternative forms of the invention. It will thus be understood that these means 13 and 14 could be separately formed.

As seen in FIGURES 1 and 4, the tapering gauge means 13 constitutes an elongated pin or post which again may be of a metallic material, or of a suitable plastic or the like as desired. The pin or post 13 has a circular cross sectional configuration and accordingly, it measures highly accurately since it hits on the high points of the gap or electrodes only. Thus, it happens on occasion that the points of a spark plug are not parallel or are slanted, and the tapered pin gauge 13 will locate these high points. All that need be done for this purpose is to slide the gap along the pin 13, and the high points can thereby be aligned and determined on the gap, since in effect the pin provides opposed contact points rather than a broad surface. Also, the rounded configuration of the pin serves to cam the points into position so that an accurate determination may be made.

It will be seen that suitable width indicating indicia are formed opposite the post in register therewith, the numbers indicating the gap width. Thus the spark plug is slid along until the high points are determined by contact with the post or pin 13. By reading the indicia registered with and opposite the contact with the points, an accurate determination of the width is made. The simplicity of this operation will be readily appreciated, inasmuch as a reading can be made without any special skills or techniques.

The tapering means 14 is similarly of a simple construction and in fact is formed integrally with the plate 11. To this end, the plate 11 may be machined along one margin of the plate at a predetermined gradient, so that the surface 15 of the margin gradually tapers relative to the surface of the side 16 of said plate 11 adjacent thereto. While both sides of the plate could be tapered, including the opposite or rear side 17 of the plate, it will be seen that the disclosed construction is extremely simple to manufacture and is also reliable, since instead of two machining operations, only one is required. Furthermore, a direct reading may be obtained by reference to indicia aligned with the marginal portion 15.

While the surface provided by the tapering means 14 is relatively wide, so that it is somewhat more difficult to determine the high points of the electrodes than with the pin means 13, nevertheless a relatively highly reliable instrument is afforded which can be carried as a unitary device and which permits a direct reading with the indicia on the flat surface 16 of the plate. Thus, no interference with the reading is entailed, such as would exist if the indicia had to be read directly from the tapered surface as with a simple wedge.

Referring again to the means 13, it will be seen that the post is characterized by a shoulder 18 which abuts a stamped out or raised lug or ear 19 formed integrally with the plate 11 and defining an opening therethrough. The opening thus is enabled to receive snugly a reduced end extension 20 of the post or pin 13. A correspondingly raised lug or ear 21 is disposed at the opposite end of the post or pin 13 and again secured this opposite end snugly against the plate.

In order to permit adjustable movement of the spark plug 12 along the post without interference, the plate 11 is characterized by a cutout construction defining a preferably rectangular recess 22, so that the pin is spaced in substantially parallel relationship to a side edge 23 of the plate opposite the edge 24 adjacent the margin 15. And in order to provide means for connecting the post or pin to the plate in the said parallel position, the plate has end extensions 25 and 26 in parallel, coplanar alignment with the main portion thereof.

To provide an easy and direct reading of the position and width of the spark plug gap, the area of the plate immediately contiguous with the edge 23 is engraved or otherwise suitably imprinted with indicia as shown.

So as to permit a wide variety of types of readings to be made and to afford conventional standards to check the reading on the gap determined as described, the invention includes a set of gauges 27 which are secured by fastening means 28 in pivotal relation to the plate. Thus the gauges 27 may constitute a standard set of such units and the fastening means 28 may include a screw 29 extending, for example, to the rear portion of the plate 11, and a nut 30 on the front portion of plate 11. The nut may be released to permit replacement or supplementation of the gauges.

It will also be seen that a gap adjusting member or tool 31 may be similarly mounted on the fastening means 28, having cuts 32 and 33 at one free end thereof so that the gap of an electrode or spark plug may be adjusted thereby as will be understood by those skilled in the art. The free end of the tool 31 may also have formed therein an aperture 32a which can be used to hang the tool or gauge 10 in position on a hook.

However, the invention includes means for directly hanging the plate 11 on a hook, such as the hook 34, comprising an opening 35 formed at one end of the plate and preferably opposite the screw means 28.

Again, and so as to afford a highly compact and versatile implement, the plate 11 may itself define end cuts or hooks 36 and 37 by means of which the spark plug gap may be adjusted as the need is by the tapering gauge means 13 and 14 or otherwise.

Accordingly, there has been provided a simple, rugged and highly reliable gauge for spark plug gaps and the like. The gauge encompasses unitary means for supporting the same and for adjusting the gap once the variation from a desired width has been determined. Correspondingly, the gauge is adapted for use in a wide variety of situations in addition to those described.

Although I have herein set forth and described my invention with respect to certain specific principles and details thereof, it will be understood by those skilled in the art that these may be varied without departing from the spirit and scope of the invention as set forth hereunto appended claims.

I claim as my invention:

1. A gauge comprising a plate, said plate having a recess formed in one side thereof,
   a tapering gauge member,
   means on opposite ends of the plate contiguous to the recess for securing the gauge member to the plate,
   and indicia on the plate adjacent the recess and in alignment with the gauge member, the gauge member being calibrated to provide a reading of the width of a gap between points engaged on the gauge member by reading of the indicia in register with the point of engagement.

2. The device according to claim 1, wherein the gauge has means for supporting the gauge on a wall or the like.

3. The device according to claim 2, wherein the gauge includes a plurality of feeler gauges.

4. The device according to claim 1, wherein the plate also has formed therein a marginal portion tapering gradually therealong, and indicia in register with the marginal portion, said marginal portion being calibrated to provide an accurate reading of the gap between points when the points are engaged on the marginal portion, by reading of the indicia opposite the point of engagement on the marginal portion.

5. A gauge for measuring the gap between the electrode of a spark plug or the like comprising,
   a tapering gauge member having a shoulder at an enlarged end thereof, and a reduced extension from the shoulder,
   a plate having a pair of opposed ears with a recess extending therebetween,
   upset portions on the opposed ears receiving the reduced portion of the gauge member adjacent the shoulder and the end of the gauge member opposite the shoulder, respectively,
   and indicia on the plate in substantially parallel relation with the gauge member,
   said gauge member being calibrated to provide a reading of the gap between the electrodes of a spark plug when the electrodes are engaged on the gauge member by a reading of the indicia in register with the point of engagement.

References Cited in the file of this patent

UNITED STATES PATENTS

| | | |
|---|---|---|
| 146,974 | Allen | Feb. 3, 1874 |
| 987,703 | Curtin | Mar. 28, 1911 |
| 1,149,277 | Moffatt | Aug. 10, 1915 |
| 1,377,238 | Williams | May 10, 1921 |
| 2,492,380 | Duma | Dec. 27, 1949 |
| 3,045,354 | Frauenholtz | July 24, 1962 |